Patented Mar. 19, 1935

1,994,735

UNITED STATES PATENT OFFICE 1,994,735

DEVELOPING METHOD FOR CINEMATOGRAPHIC FILMS

Paul Vanet, Vesinet, France, assignor to Le Film Ozaphane, a corporation of France No Drawing. Application December 17, 1930, Serial No. 502,993. In France December 19, 1929

14 Claims. (Cl. 95—88)

This invention relates to a method of developing cinematographic films.

Films consisting of sheets or pellicles of regenerated cellulose and sensitized throughout their mass with products which are sensitive to light and soluble in water are well known. These films, when developed in an aqueous medium, become wetted with the result that upon drying the films are distorted. French Patent 558,465 overcomes this defect by employing a gaseous medium as the developing agent. According to this patent, a film of regenerated cellulose impregnated with a mixture of a diazo compound and a phenol is developed by treatment with gaseous ammonia.

According to the present invention, it has been found that results comparable to the above may be secured by employing a developing agent which only slightly wets the film. The degree of wetting is such that the film is not subjected to distortion upon drying which is unavoidable during the drying of a film developed in a bath which wets the base thereof.

In one of the modifications of the present invention, a film of the above mentioned type is developed by treatment with an aqueous solution containing a gaseous ammonia dissolved therein, the quantity of ammonia being such as will effect the desired reaction. The solution also contains a volatile fluid, commonly called an organic solvent, miscible with water and inert with respect to the reacting materials and the resulting products. The quantity of the volatile fluid or organic solvent is such that upon treatment with the solution the film is only slightly wetted.

To more fully explain this modification of the invention, the following specific example is given:

*Example.*—A film of regenerated cellulose sensitized by impregnation with a diazo compound and a phenol is. subjected, after exposure, to a developing agent such as a solution containing 30% of water, 70% of alcohol and sufficient gaseous ammonia therein to effect the desired reaction. After development, the film is dried in the usual manner. The final product is substantially free from distortion.

It has been found that the developing solution above described is suitable for another method of making films wherein the image is formed by an azo dyestuff. According to this modification, a cellulose film may be made by sensitizing the base thereof with a simple diazo compound which is sensitive to light and adapted to form a dyestuff through copulation with an amine or a phenol, the latter being used in the presence of an alkali. After exposure, the film is developed by treatment with a solution containing an amine, water and a volatile liquid, such as alcohol. Alternately, the developing and fixing composition may comprise an aqueous solution containing a phenol, an alkali and a volatile liquid, such as alcohol.

Instead of ammonia any other substance having an alkaline reaction and being soluble in the mixture of water and alcohol, as for instance caustic potash, could also be used in the above mentioned processes.

If the excess of substances retained by the film should have a detrimental effect upon the conservation of the image or of the carrier, such excess would be eliminated by a subsequent washing in which a solution comprising a mixture of water and alcohol, for instance in the proportion of 70% alcohol and 30% water is used.

The proportion of alcohol may also be diminished, provided that the process is accomplished more rapidly, in order not to allow the film time enough to absorb too much water.

Obviously, instead of alcohol any other organic and volatile fluid miscible with water and having no effect on the employed products, as for instance acetone, may also be used. Moreover, the proportion of 70% for the organic solvent is given only by way of example, the invention covering also the use of any organic solvent having the above mentioned properties and adapted to enter into the mixture in a proportion which is sufficient in order that the film mass may be but very slightly wetted.

Finally the invention covers also the use of such a solvent for providing tinges or shades and tonings of films of cellulose by means of any soluble dye-stuffs or any suitable products.

The method according to the invention is also applicable to cellulose films which are sensitized with other products than diazoic products being soluble in water.

Having now particularly described and ascertained the nature of my said invention and in what manner the same is to be performed, I declare that what I claim is:

1. A method of developing and fixing regenerated cellulose films sensitized with a diazo compound, which comprises subjecting said film to an aqueous solution containing a volatile organic solvent, the latter being inert with respect to the substances entering the reaction and the products of the reaction and serving to permit only slight wetting of the base by the water, whereby the film upon subsequent drying will be substantially free from distortion.

2. A method of developing and fixing regenerated cellulose films sensitized with a diazo compound, which comprises subjecting said film to an aqueous solution comprising a volatile alcohol present in such proportions as will permit only slight wetting of the base by the water, whereby the film upon subsequent drying will be substantially free from distortion.

3. A method of developing and fixing regenerated cellulose films sensitized with a diazo compound and a phenol, which comprises subjecting said film to an aqueous solution containing alkali and a volatile organic solvent, the latter being inert with respect to the substances entering the reaction and the products of the reaction and serving to permit only slight wetting of the base by the water, whereby the film upon subsequent drying will be substantially free from distortion.

4. A method of developing and fixing regenerated cellulose films sensitized with a diazo compound and a phenol, which comprises subjecting said film to a solution comprising water, alkali and alcohol, the latter being volatile and present in such proportions as will permit only slight wetting of the base by the water, whereby the film upon subsequent drying will be substantially free from distortion.

5. A method of developing and fixing regenerated cellulose films sensitized with a diazo compound, which comprises subjecting said film to an aqueous solution containing a phenol, alkali and a volatile organic solvent, the latter being inert with respect to the substances entering the reaction and the products of the reaction and serving to permit only slight wetting of the base by the water, whereby the film upon subsequent drying will be substantially free from distortion.

6. A method of developing and fixing regenerated cellulose films sensitized with a diazo compound, which comprises subjecting said film to an aqueous solution containing a phenol, ammonia and a volatile organic solvent, the latter being inert with respect to the substances entering the reaction and the products of the reaction and serving to permit only slight wetting of the base by the water, whereby the film upon subsequent drying will be substantially free from distortion.

7. A method of developing and fixing regenerated cellulose films sensitized with a diazo compound, which comprises subjecting said film to a solution comprising a phenol, water, ammonia and alcohol, the latter being volatile and present in such proportions as will permit only slight wetting of the base by the water, whereby the film upon subsequent drying will be substantially free from distortion.

8. A method of developing and fixing regenerated cellulose films sensitized with a diazo compound and a phenol, which comprises subjecting said film to an aqueous solution containing ammonia and a volatile organic solvent, the latter being inert with respect to the substances entering the reaction and the products of the reaction and serving to permit only slight wetting of the base by the water, whereby the film upon subsequent drying will be substantially free from distortion.

9. A method of developing and fixing regenerated cellulose films sensitized with a diazo compound and a phenol, which comprises subjecting said film to a solution comprising water, ammonia and alcohol, the latter being volatile and present in such proportions as will permit only slight wetting of the base by the water, whereby the film upon subsequent drying will be substantially free from distortion.

10. A method of developing and fixing regenerated cellulose films sensitized with a diazo compound, which comprises subjecting said film to an aqueous solution containing an amine and a volatile organic solvent, the latter being inert with respect to the substances entering the reaction and the products of the reaction and serving to permit only slight wetting of the base by the water, whereby the film upon subsequent drying will be substantially free from distortion.

11. A method of developing and fixing regenerated cellulose films sensitized with a diazo compound, which comprises subjecting said film to an aqueous solution containing an amine and alcohol, the latter being volatile and inert with respect to the substances entering the reaction and the products of the reaction and serving to permit only slight wetting of the base by the water, whereby the film upon subsequent drying will be substantially free from distortion.

12. An aqueous solution for developing regenerated cellulose film sensitized with a diazo compound, which contains an amine and alcohol, the latter being volatile and present in such proportion as will permit only slight wetting of the film by the water, whereby the film upon subsequent drying will be substantially free from distortion.

13. An aqueous solution for developing regenerated cellulose film sensitized with a diazo compound and a phenol, which contains ammonia and alcohol, the latter being volatile and present in such proportion as will permit only slight wetting of the film by the water, whereby the film upon subsequent drying will be substantially free from distortion.

14. An aqueous solution for developing regenerated cellulose film sensitized with a diazo compound, which contains ammonia, phenol, and alcohol, the latter being volatile and present in such proportion as will permit only slight wetting of the film by the water, whereby the film upon subsequent drying will be substantially free from distortion.

PAUL VANET.